May 9, 1944.　　　　　L. S. WILLIAMS　　　　　2,348,374
WEIGHING SCALE
Filed Jan. 17, 1942　　　　　4 Sheets-Sheet 1
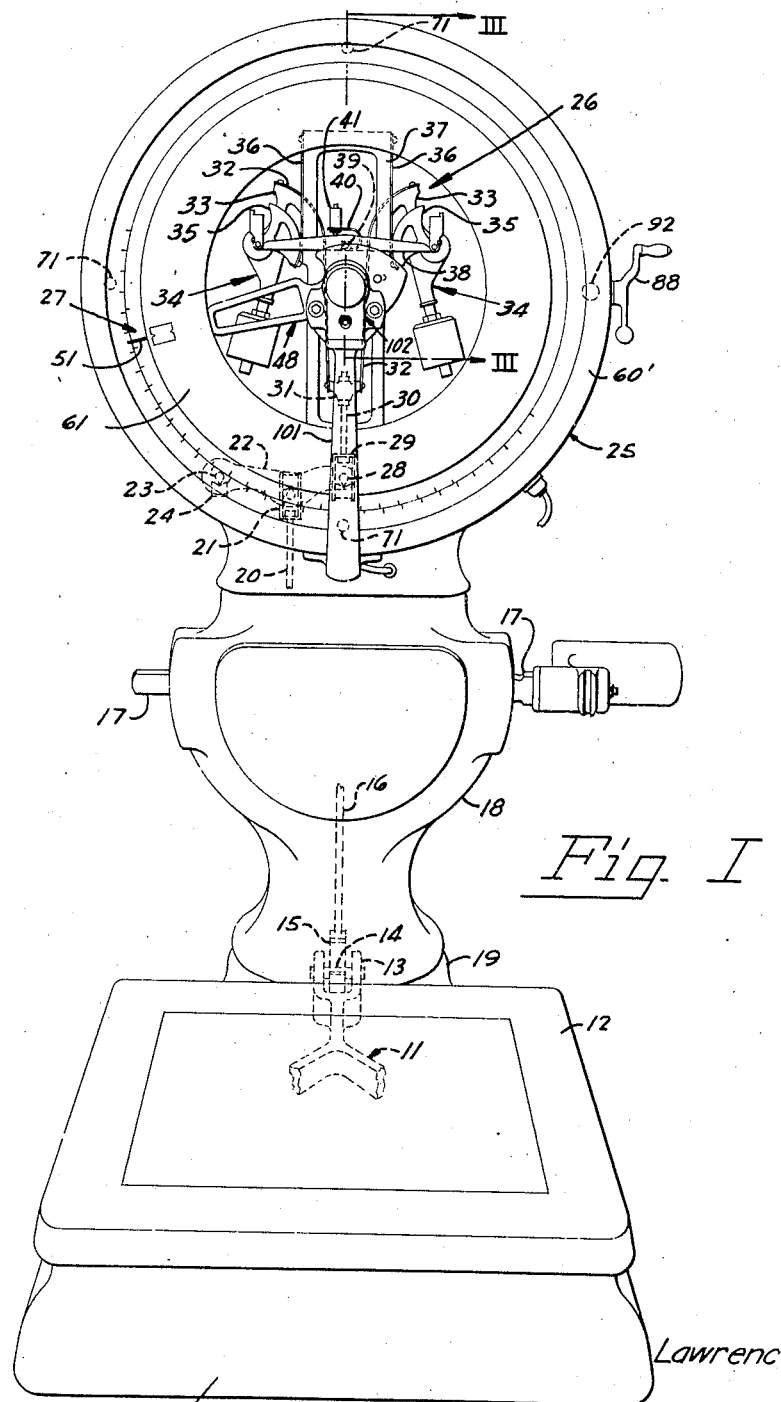
Fig. I
Lawrence S. Williams
INVENTOR
BY Marshall & Marshall
ATTORNEYS

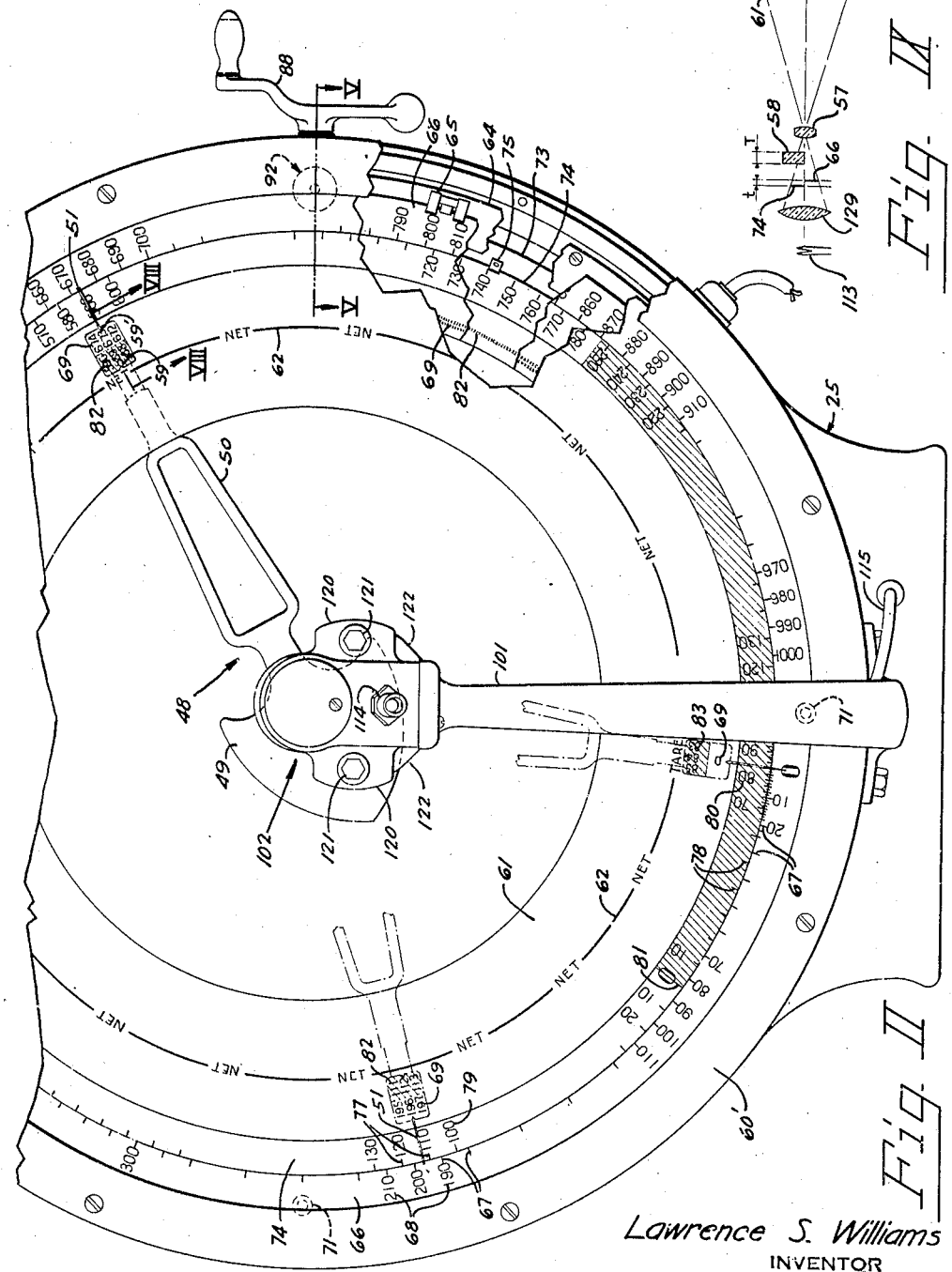

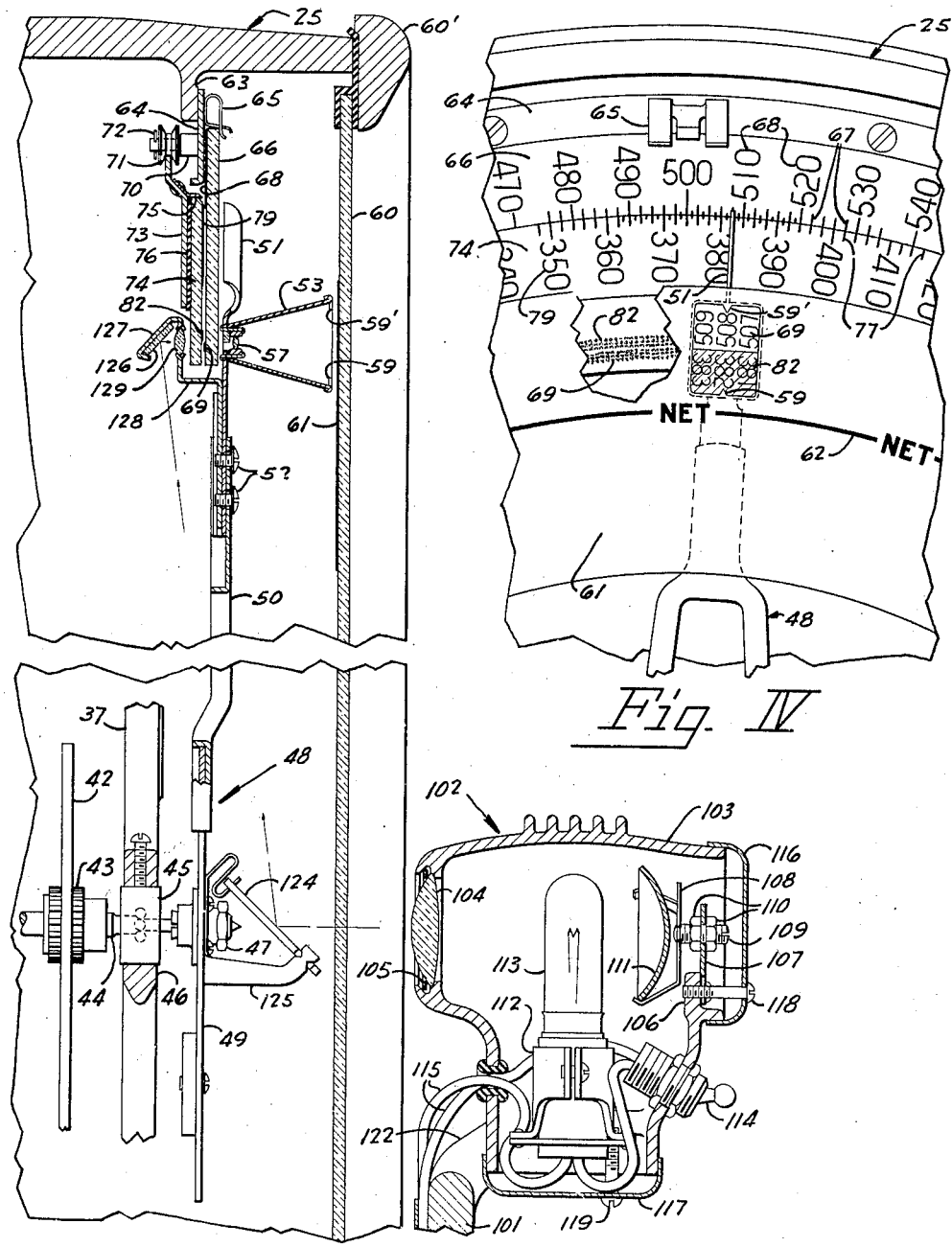

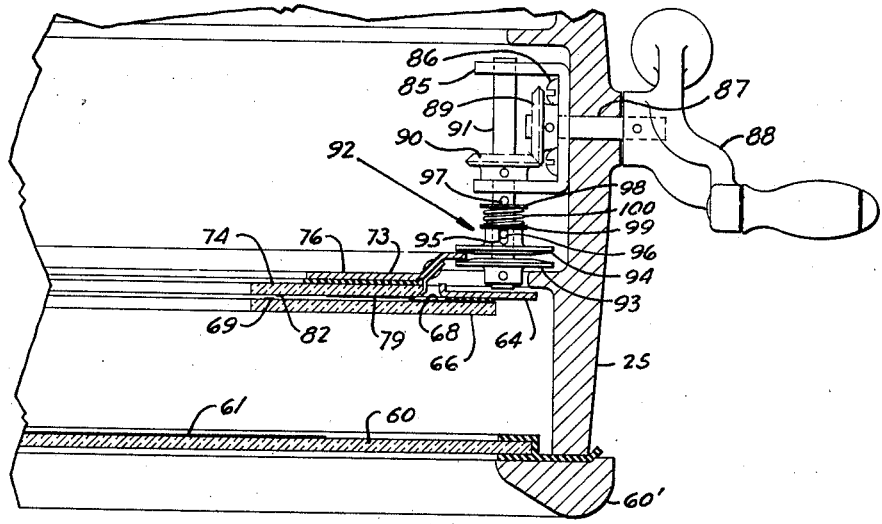
Fig. V
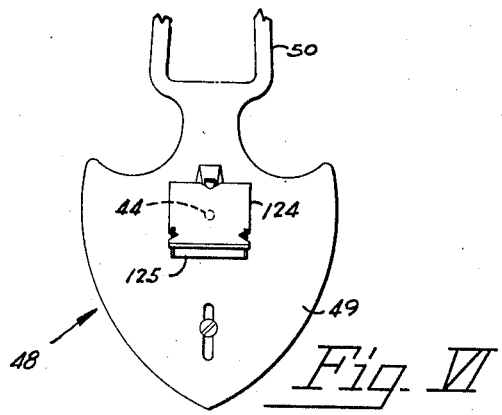
Fig. VI
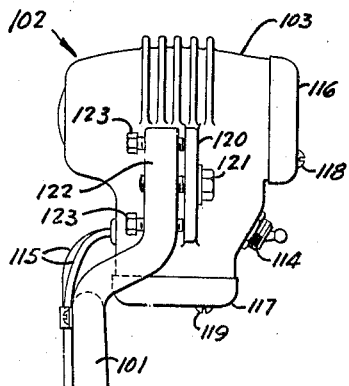
Fig. VII
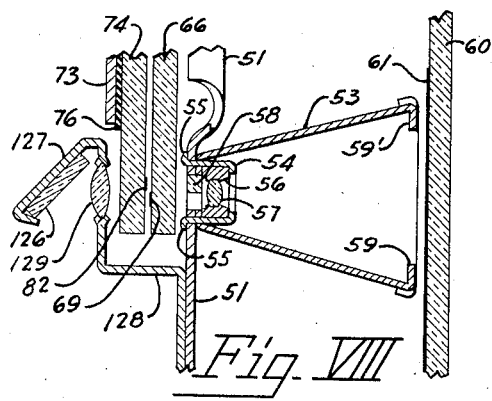
Fig. VIII
Lawrence S. Williams
INVENTOR
BY Marshall & Marshall
ATTORNEYS Patented May 9, 1944

2,348,374

UNITED STATES PATENT OFFICE 2,348,374

WEIGHING SCALE

Lawrence S. Williams, Toledo, Ohio, assignor to Toledo Scale Company, Toledo, Ohio, a corporation of New Jersey Application January 17, 1942, Serial No. 427,161

12 Claims. (Cl. 88—24)

This invention relates generally to weighing scales having means for projecting the weight indications, and more particularly to projecting scales adapted to give an optically projected indication of the tare weight, the gross weight and of the net weight of a load.

The principal object of this invention is the provision of improved means in a weighing scale, for simultaneously giving an optical indication of the gross weight and of the net weight of a load on the scale.

Another object is the provision of improved means for mounting and actuating two relatively movable light permeable indicia bearing charts.

Another object is the provision of two closely adjacent, concentric, parallelly mounted annular indicia bearing charts of glass or other light permeable material, there being a series of weight indicia printed on that face of each chart, adjacent the face of the other chart.

A further object is the provision of improved means for simultaneously projecting images of indicia printed on both of said charts.

A further object is the provision of a pair of relatively movable indicia bearing charts of light permeable material and an indicator movable relatively to both of said charts.

Still another object is the provision of improved means whereby the projected images of opaque indicia on two charts lying in different planes and projected by a single optical means are caused to sharply focus on a single planar screen.

These, and other objects and advantages will be apparent from the following description in which reference is had to the accompanying drawings, illustrating a preferred embodiment of the invention and in which similar reference numerals refer to similar parts throughout the several views.

In the drawings:

Fig. I is a front elevational perspective view of a device embodying the invention.

Fig. II is an enlarged front elevational view of the indicating head of the device, a portion being broken away.

Fig. III is an enlarged fragmentary sectional view sectioned substantially along the line III—III of Fig. I, showing particularly the optical projecting means.

Fig. IV is an enlarged fragmentary front elevational view illustrating the appearance of the simultaneously projected indication of the gross weight and of the net weight of a load.

Fig. V is an enlarged fragmentary sectional plan view along the line V—V of Fig. II, showing in detail the means for rotating the net weight chart.

Fig. VI is an enlarged fragmentary front elevational view of the indicator, showing in detail one method of mounting a reflecting mirror.

Fig. VII is an enlarged fragmentary side elevational view of the light source casing, showing its adjusting means in detail; and, Fig. VIII is an enlarged fragmentary sectional view through the relatively movable optical projecting means, the section being taken along the line VIII—VIII of Fig. II.

Fig. IX is a diagram of the image projecting means.

Referring to the drawings in detail:

The scale in which the invention is shown embodied is a well known type and comprises generally a base 10 which houses a load supporting lever mechanism 11, upon which a load receiving platform 12 is mounted in the usual manner. An extending nose 13 of the lever mechanism 11, by means of a pivot 14, engages a stirrup 15 on the lower end of a connecting rod 16 whose upper end, also provided with a suitable stirrup, pivotally engages an intermediate lever 17, suitably fulcrumed, and positioned in the interior of an expanded portion of a column 18 which surmounts a deck 19 projecting rearwardly from the base 10. The intermediate lever 17, in addition to its fulcrum pivot and load pivot (not shown), which the connecting rod 16 engages, is also provided with a power pivot engaging a stirrup on the lower end of a connecting rod 20, the upper end of which, also provided with a stirrup 21, pivotally engages a pendulum lever 22 fulcrumed at 23, upon suitable bearings 24, in the interior of a substantially watchcase-shaped housing or casing 25 which supports and houses a load counterbalancing mechanism 26 and indicating means 27. These indicating means 27 cooperate with and are actuated by the load counterbalancing mechanism to indicate the weights of loads placed on the platform 12.

To transmit the "pull" resulting from a load on the platform 12, the free end of the lever 22, by means of a pivot 28 which is fixed therein, engages a suitable bearing in a stirrup 29 on the lower end of a rod 30, whose other end is locked in a cross head 31. The machined ends of this cross head are fastened to the lower ends of flexible metallic ribbons 32, their upper ends overlie and are fastened to arcuate faces of power sectors 33, which are component parts of load counterbalancing pendulums 34.

To the lower ends of arcuate faces of fulcrum sectors 35, which also are component parts of the pendulums 34, are secured the lower ends of flexible metallic ribbons 36 whose upper ends are fastened to the parallel machined faces of a pendulum frame 37. The metallic ribbons 36 thus support the entire load counterbalancing mechanism. The pendulums 34, in addition to the hereinbefore mentioned power sectors 33 and fulcrum sectors 35, comprise the usual pendulum body stem and adjustable pendulum weight.

To actuate the indicator, a pair of plates 38, whose ends pivotally engage the centers of revolution of the pendulums 34, are provided at a point midway between their ends with apertures in which tenoned ends of a bar 39 are mounted. This bar has a rectangular cross section, and fastened to a face thereof is one end of a substantially C-shaped flexible member 40. The other end of this C-shaped member supports a rack foot 41 and the teeth of a rack 42, which is adjustably held in this rack foot, mesh with the teeth of a pinion 43 keyed on a shaft 44 whose tenoned ends rest in antifriction ball bearings 45 seated in horizontally extending flanges 46 of the pendulum frame 37 (Fig. III). That tenon of the shaft 44, which extends through its ball bearing 45 on the front of the scale, has clamped to it, by means of a hub-like clamp 47, an indicating member 48. The indicating member 48 comprises a hub plate 49, a bifurcated arm 50, which is secured to the hub plate, and an index 51 which is adjustably secured to the bifurcated arm 50 by means of screws 52.

Secured to the index 51, near its upper end (Fig. VIII) is a shadow-box 53. This shadow-box is in the form of a frustum of a cone whose small end is closed and in this closure is an aperture. A similar aperture is provided in the index member 51. A small bushing 54 positioned in the interior of the shadow-box has two longitudinally extending tabs 55 extending through aligned slots in the shadow-box and in the index member 51. These tabs are clinched on the back of the index member 51, securely fastening the shadow-box thereto.

Seated in the bushing 54 is an annular member 56 retaining a small projecting lens 57 and mounted in the interior of the aligned apertures in the shadow-box 53 and the index 51 is a small segment 58 of optical glass whose thickness is defined by a pair of parallel planes. The purpose of this glass segment will hereinafter be more particularly described.

The outer free end of the conical shadow-box 53 is stretched and formed to a substantially rectangular shape. The edge of the metal at the rectangular end is bent outwardly and upon itself to form a rim. Two small arrowpoint-like portions 59 and 59' however on opposite sides are turned to project inwardly. These are located in coincidence with the longitudinal axis of the bifurcated arm 50 and serve as pointers.

The length of the shadow-box 53 is such that the edge of its open end just clears the inner face of a pane of transparent glass 60 which, by means of a frame 60', is fastened to the housing 25 to enclose its open front. An annular zone 61 of the plane of glass 60 (Figures III and II) is coated to destroy its transparency but leaving it translucent to light to form a projection screen. Before coating this zone, a concentric broken line 62 and the word "Net," positioned in the spaces of this line, are printed upon the rear of the plane of glass 60 so that after the coating is applied the line and the words are visible from the opposite side. For a purpose, which will later become clear, in one of the spaces of the broken line 62 the word "Tare" is printed.

To support the relatively movable indicia bearing charts, the housing is provided with a number of inwardly projecting bosses 63 to which an annular metallic plate 64 is bolted. To gain stiffness and strength the inner periphery of this annular member is flanged, and welded, or otherwise secured, to the outer face of this annular plate 64 are a plurality of spaced spring clips 65 which serve to retain an annular weight indicating chart 66, made preferably from transparent glass, although a sheet of highly transparent and colorless synthetic resin may be employed. Printed on the rear face of the annular chart 66, adjacent the outer periphery, is a series 67 of concentrically arranged and radially extending weight graduations and a series of weight designating numerals 68. Since the graduations are closely spaced, a designating numeral in this example can only be provided for each 10 pound increment to give the operator of the scale a rough indication of the weight of a load when placed on the platform 12. The zone occupied by the graduations 67 and the numerals 68, after these are printed upon the chart, is coated with an opaque medium forming a background for the printed characters to enhance their visibility. On the remaining transparent zone of this annulus, adjacent the inner periphery, is printed a series of small weight designating numerals 69 with an opaque medium, the size of these numerals being such that a numeral can be provided for each weight graduation of the series 67.

Riveted, welded, or otherwise fastened, and extending rearwardly from the annular plate 64 are a plurality of tenoned posts 70, each tenon supporting a small spool-like roller 71. These rollers 71 are prevented from shifting laterally on the tenon by the shoulder formed by the post and a pin 72 extending through the tenon. Rotatably mounted between and guided by the spaced spool-like rollers 71 is a circular formed plate 73 (Fig. III), the outer periphery forming a flange which enters the grooves of the spool-like rollers. The plane of the main body is forwardly offset from the plane of the flange, so that the outer face of an annular chart 74 of glass, or other transparent material, when clamped thereto, by means of a series of clips 75, is positioned closely adjacent the inner face of the chart 66. A thin annulus of felt or rubber 76 is positioned between the chart 74 and the plate 73. The outer annular zone on the front face of the chart 74 is coated with an opaque medium, and printed thereon are two series of radially extending weight graduations 77 and 78 and weight designating numerals 79 and 80 (Fig. II), there being a weight designating numeral provided for each 10 pound weight increment, each series extending in arithmetical progression in opposite directions from a zero graduation 81. Printed on the forward face of the annular chart 74, in the transparent zone adjacent the inner periphery, are two series of small weight designating numerals 82 and 83. The size of these numerals is such that a numeral can be provided for each pound increment of weight. These series are arranged concentrically to the series 69 on the chart 66, the series 82, in the operation of the scale indicating the net weight of a commodity on the platform, and the series 83 being adapted to indicate the tare weight of a container. The series of weight designating numerals 69, 82 and 83 are positioned on the charts 66 and 74 so that they are stationed within the field of the projecting lens 57 carried by the indicator.

To enable the operator of the device to rotate the chart 74 in determining the tare and the net weight of a load, the following means are provided: mounted for rotation in a bore in the wall of the housing 25, substantially in a plane passing horizontally through the center of the housing is a short shaft 87. This shaft also extends through the web of a channel-shaped bracket 85 bolted to the housing by means of screws 86. Pinned to the outer end of this shaft is a crank-like handle 88. The inner end of this shaft has pinned thereto a small bevel gear 89 whose teeth mesh with teeth of a similar bevel gear 90 pinned to a shaft 91 which is journaled at right angles to the shaft 87, in apertures in the inwardly extending arms of the bracket 85.

To grippingly engage the flange of the formed annular plate 73, to which the chart 74 is secured, a spring tensioned friction gear 92 is mounted upon an extending end of the shaft 91. This friction gear 92 comprises two small beveled friction disks 93 and 94. The disk 93 is pinned to the shaft so that its beveled face is in engagement with one face of the flange. The friction disk 94 is slidably mounted on the shaft 91 in opposed relation to the friction disk 93 so that its bevel face engages the opposite face of the flange. A small compression spring 100, encircling the shaft, serves to hold the friction disks 93 and 94 in frictional engagement with the flange, the spring 100 being positioned between a washer 99, which is interposed between one end of the spring and the hub of the friction disk 94, and a washer 98, which is stationed between the other end of the spring and a pin 97 extending through the shaft 91. The slidable friction disk 94 is prevented from turning independently of the shaft by a pin 96, fixed in this shaft and having an extended end positioned in a slot 95 cut laterally through the hub. The depth of the slot 95 in the hub is sufficient to permit limited movement longitudinally of the shaft.

To cooperate with the projecting lens 57, mounted in the shadow-box 53 on the indicator 51, to project images of portions of the series 69 and 82 of weight indicia on the charts 66 and 74 respectively, the following means are provided:

Bolted to the housing 25 and extending upwardly is a bracket 101. The upper end of this bracket is bifurcated, forming two arms 122 which serve to support a light projecting means 102 for projecting a pencil of light into the interior of the housing 25. This light projecting means 102 comprises a substantially T-shaped hollow casing 103, the ends of all the branches being open and in the opening directed towards the housing 25 a condensing lens 104 is mounted. This lens is retained in the opening by means of a split spring ring 105. Within the rear opening, an inwardly projecting boss 106 serves as an anchorage for a small metal plate 107.

Adjustably secured to the plate 107, by means of a threaded stem 109, is a three-armed spring clip 108. The stem 109, which is riveted to the clip 108, projects through an opening in the plate 107 and is locked thereto by means of lock nuts 110. The three forwardly extending arms of the spring clip 108 serve to hold a concave polished reflector 111.

Fixed in the lower opening of the casing 103 is a socket 112 for the reception of an electric lamp 113, which is preferably of the type having a concentrated filament. The position of the socket 112 is predetermined so that the aforementioned concentrated filament of the lamp 113 is positioned in a plane passing horizontally through the center of the lens 104 and that of the reflector 111.

A toggle switch 114, clamped in a wall of the casing 103, serves to open and close a circuit 115 which connects the lamp 113 with a current supply. Light, stamped metal covers 116 and 117 are provided for the rear and bottom openings respectively, and are held in position by screws 118 and 119.

For the purpose of focusing the pencil of light emanating from the light projecting means 102, the casing 103 is adjustably secured to the forked arms 122 of the bracket 101. To accomplish this the casing 103 is provided with two laterally projecting ears 120 penetrated by bolts 121 which are threaded into apertures in the forked arms 122. Each of these arms is also provided with two apertures (Fig. VII), one on each side of the aperture which receives the bolt 121. The ends of bolts 123, which are threaded through these spaced holes in the arms 122, engage the inner face of the ears 120 of the casing 103. By adjusting the bolts 121 and 123 in the well known manner, the position of the light projector 102 may be adjusted so that the pencil of light emerging therefrom will impinge upon a diagonally positioned reflector 124 mounted in the axis of rotation of the indicator 48. This reflector 124 is secured, by means of a spring clip 125, to the hub plate 49, and rotates with the indicator when a load is placed on the platform of the scale. The reflector 124 is preferably a first surface mirror and is positioned so that the pencil of light is reflected through the opening formed by the bifurcated arms 50 of the indicator 48 to a reflector 126, secured to a diagonally bent portion 127 of a formed sheet metal member 128, fastened to the rear of the index 51.

A portion of the sheet metal member 128, extending parallel to the index 51, serves to support a small condensing lens 129 which is positioned to direct the pencil of light, reflected by the reflector 126, through the transparent zones of the charts 66 and 74 and the objective or projecting lens 57.

Since a common objective or projection lens 57 is provided to project the images of indicia marked on the spaced faces of the charts 66 and 74, the small glass segment 58 is provided to intercept the light that passes through the indicia on the chart 74, which is at the greater distance from the projecting lens 57. Due to the fact that the glass segment is equivalent to less than its thickness of air, the projecting lens 57 is in effect brought closer to the indicia on the chart 74 and thus the indicia on both charts can be focused by a single lens. The segment 58, whose faces are parallel, is mounted in the interior of the bushing 54 immediately in back of the projecting lens 57, its straight edge being in coincidence with a plane bisecting the lens. It is preferably tinted, and may also be made from transparent synthetic material having the required optical characteristics.

The thickness of this segment 58 is determined as follows:

Assuming that the space $t$, between the adjacent faces of the charts 66 and 74 (Fig. IX), is .040″;

$I$, the index of refraction of the material from which segment is made, is 1.5 and T is the thickness of the segment, thus $$t = \frac{T}{I}$$

$$t = T - \frac{T}{I}$$

$$.040'' = T - \frac{T}{1.5}$$

$$.060'' = .5T$$

T = .120" of material having an index of refraction of 1.5

The series 82 of indicia on the annular chart 74, projected by that portion of the pencil of light intercepted by the segment 58, are adapted to indicate the net weight of the load being weighed. The use of tinted material for the segment, as hereinbefore mentioned, is for the purpose of displaying these net weight figures on a colored background on the screen 61 so that they are readily distinguishable from the indicia of the gross weight which are displayed on an untinted background.

The device is operated as follows: For example, it is desired to fill a box of unknown weight with a predetermined amount of commodity, the box is placed on the platform 12 of the scale, and its weight, through the levers and the connecting members, acts on the load counterbalancing mechanism. The pendulums, in a manner that is now widely known, swing outwardly and upwardly until their moment balances the moment of the load. The indicating member 48, through the means described, is actuated by the pendulums and rotates through an angle that is proportionate to the load and its index 51 points to the proper weight graduations in the series 67 on the opaque zone of the annular chart 66. By throwing the switch 114 the lamp 113 is energized and the resulting pencil of light, by means of the condenser lens 104 in the light projecting means 102, is concentrated upon the reflector 124 and reflected to pass through the bifurcation of the indicating member 48 to strike the reflector 126 near the outer end of indicating member 48. The pencil of light is then reflected from the reflector 126 to pass through the condenser lens 129, through the charts 74 and 66 and then through the objective or projection lens 57, thus projecting images of the proper weight numerals in the series 69 of "gross-weight" designating numerals that are printed on the transparent zone of the chart 66, onto the translucent zone 61 on the casing glass 60, which forms a "screen."

The image of the numeral in registry with the shadow of the pointer 59, which projects inwardly from the edge of the shadow-box 53, indicates the weight of the box. The operator then, by turning the crank-like handle 88, through the means described, rotates the formed plate 73 to which the chart 74 is clamped, until the zero indicium of the series 82 of net weight designating numerals is in registry with the shadow of the pointer 59. The operator then places commodity in the box until the image of the numeral designating the desired amount appears in registry with the image of the index 59, on the translucent zone 61. This is the net weight of the material in the box. As previously mentioned, that portion of the pencil of light which is adapted to project the net weight numerals is tinted by the segment 58 in the projecting means, so that these net weight numerals appear on a tinted background to readily distinguish them from the images of the gross weight indicating numerals immediately adjacent the net weight numerals and indicated by the pointer 59'. Since the shadow-box 53 cuts off all stray light, the images of the numerals appear on a brilliantly illuminated field and, since the shadow of the pointers 59 and 59' and the images of the numerals appear in the same plane on the screen 61, there is no parallax and the operator may observe these indications from any convenient position. Upon removal of the box with its commodity, the indicator, in the usual manner, returns to its zero position and the tare weight of the box is then projected from the series 83 of tare weight numerals on the chart 74, immediately below the word "Tare" which is printed in the space of the broken line 62 in registry with the zero indicium of the series 67 of gross weight indicia on the chart 66 and is visible on the screen formed by the translucent zone 61 of the casing glass 60. If such a record is required, the operator may then record this directly indicated tare weight without performing a mental or other calculation.

In some filling operations, especially such in which a large number of containers that vary slightly in weight are filled with equal predetermined amounts of material flowing from a bin, or other receptacle, under the control of the operator, for example in filling kegs of nails, the containers are previously weighed and their weight legibly marked thereon. In this operation, the operator before placing the keg on the platform of the scale turns the net weight chart 74 in the manner hereinbefore described until the numeral corresponding to the weight of the keg is projected and indicated by the pointer 59 while the index 51 is in registry with the zero indicium of the series 67 of graduations on the opaque zone on the chart 66. Placing the keg on the platform now moves the indicator 48 until the zero indicium of the series 82 of net weight indicia is projected in registry with the pointer 59 and he then permits the nails, or other commodity, to flow into the keg until the numeral designating the desired net weight registers with this pointer. The outer row of projected numerals indicates the gross weight of the keg and the commodity.

For many weighing operations the graduations in the series 67 and designating numerals 68 are superfluous, but when the device is used in connection with means which allow the commodity to flow into the container the projected numerals are not legible while the commodity is flowing, they appear as a continuous streak and the operator must watch the index 51 and slow up the flow of the material when the index 51 approaches the desired weight indicium in the series 71. Then by allowing the material simply to "trickle" into the container the exact amount can be readily determined without removing or adding small amounts.

Having described the invention, I claim:

1. In a device of the class described, in combination, weighing mechanism including load receiving means, load counterbalancing mechanism operatively connected thereto and load indicating means actuated by said load counterbalancing mechanism comprising a rotatable indicator, a screen, optical projecting means, including an objective lens, carried by said rotatable indicator, a plurality of annular transparent charts, said charts being mounted concentrically and having planes facing each other, each of said annular transparent charts having a series of weight indicia printed on that plane facing the plane of the other of said charts, means for directing a pencil of light through said charts and through said projecting means carried by said indicator, and a segment of transparent material mounted between the outer of said charts and said objective lens to intercept that portion of such pencil of light passing through the indicia spaced at the greater distance from the objective lens whereby images from the indicia of both charts will be brought into focus by the projecting means on said indicator on said screen at equal magnification.

2. In a device of the class described, in combination, weighing mechanism including load receiving means, load counterbalancing mechanism operatively connected thereto and load indicating means actuated by said load counterbalancing mechanism, said load indicating means comprising a rotatable indicator, a fixedly positioned annular transparent chart, a second annular transparent chart concentric to and mounted in back of said first annular transparent chart, a casing for housing said load counterbalancing mechanism and said load indicating means, said casing having an opening, and a pane of transparent glass mounted within such opening for enclosing said load counterbalancing mechanism and said load indicating means, a translucent annular zone on said pane of transparent glass, each of said annular transparent charts having marked thereon a series of weight indicia, each series having a zero indicium, said rotatable indicator carrying a projecting lens overlying said series of weight indicia on said transparent charts, a light source, means secured to said rotatable indicator for directing a pencil of light from said light source through said annular transparent charts whereby images of indicia of said series of weight indicia on said charts are projected onto said translucent zone on said pane of glass, and means for rotating one of said annular transparent charts whereby the zero indicium on that chart is offset from the zero indicium on the other of said annular transparent charts.

3. In a device of the class described, in combination, weighing mechanism including load receiving means, load counterbalancing mechanism operatively connected thereto and load indicating means actuated by said load counterbalancing mechanism, said load indicating means comprising a rotatable indicator, a fixedly positioned annular transparent chart, a second annular transparent chart concentric to and mounted in back of said first annular transparent chart, a casing for housing said load counterbalancing mechanism and said load indicating means, said casing having an opening, and a pane of transparent glass mounted within such opening for enclosing said load counterbalancing mechanism and said load indicating means, a translucent annular zone on said pane of transparent glass, a series of weight indicia marked on each of said annular transparent charts in concentric spaced relation, each series having a zero indicium, said rotatable indicator carrying a projecting lens overlying said series of weight indicia on said transparent charts, a light source, and means secured to said rotatable indicator for directing a pencil of light from said light source through said annular transparent charts whereby images of indicia of said series of weight indicia on said chart are projected onto said translucent zone on said pane of glass.

4. In a device of the class described, in combination, weighing mechanism including load receiving means, a casing, load counterbalancing mechanism mounted within said casing and operatively connected to said load receiving means, load indicating means within said casing and operatively connected to and actuated by said load counterbalancing mechanism, said indicating means comprising a rotatable indicator, a fixedly positioned annular transparent indicia bearing chart, a plurality of radially spaced rollers mounted within said casing concentrically to said fixedly positioned annular transparent chart, an annular formed member mounted for rotation between said rollers and a second annular transparent indicia bearing chart clamped to said annular formed member, and means including a handle extending exteriorly of said casing for rotating said annular formed member and said annular transparent chart clamped thereto.

5. In a device of the class described, in combination, weighing mechanism including load receiving means, load counterbalancing mechanism operatively connected thereto and load indicating means cooperating with and actuated by said load counterbalancing mechanism, said load indicating means comprising a rotatable indicator, an annular transparent chart, a second annular transparent chart, a series of weight indicia marked on the adjacent faces of each of said charts in concentric spaced relation, said second annular transparent chart being mounted concentrically and in back of said first annular transparent chart whereby the said series of indicia on both of said transparent charts are visible through said first annular transparent chart, and means for rotating said second annular transparent chart relative to said first annular transparent chart.

6. In a device of the class described, in combination, weighing mechanism including load receiving means, load counterbalancing mechanism and load indicating means, a casing for housing said load counterbalancing mechanism and said load indicating means, said load indicating means comprising relatively movable transparent charts bearing spaced series of indicia, an indicator, optical projecting means attached to said indicator, said casing having an open face, a pane of transparent glass mounted in such open face, a translucent annular zone on said pane of transparent glass, said projecting means on said indicator being adapted to project images of such series of indicia on said charts onto said translucent annular zone, and a shadow-box surrounding said projecting means and extending between said indicia bearing charts and said translucent zone on said transparent pane of glass.

7. In a device of the class described, in combination, weighing mechanism including load receiving means, load counterbalancing mechanism and load indicating means, a casing for housing said load counterbalancing mechanism and said load indicating means, said load indicating means comprising two relatively movable transparent charts bearing concentrically spaced series of indicia, an indicator, optical projecting means associated with said indicator, said casing having an open face, a pane of transparent glass mounted in such open face on a concentric translucent annular zone, said pane of transparent glass and said projecting means associated with said indicator being adapted to simultaneously project images of such series of indicia on said charts onto said translucent annular zone.

8. In a device of the class described, in combination, weighing mechanism including load receiving means and load counterbalancing mechanism, load indicating means operatively connected to said load counterbalancing mechanism, said load indicating means including a fixedly positioned transparent chart bearing a series of opaque indicia, a second transparent chart bearing a series of opaque indicia, mounted for movement relative to said first transparent chart, an indicator cooperating with both of said charts and actuated by said load counterbalancing mechanism, a screen, optical projecting means carried by said indicator, said transparent charts being annular and positioned concentrically one in back of the other, such series of opaque indicia on said transparent charts being concentrically spaced, said optical projecting means on said indicator being positioned to simultaneously project images of indicia of such series of indicia on both of said transparent charts on said screen, and such series of indicia being marked on surfaces of said charts facing each other.

9. In a device of the class described, in combination, weighing mechanism including load receiving means and load counterbalancing mechanism, load indicating means operatively connected to said load counterbalancing mechanism, said load indicating means including a fixedly positioned transparent chart bearing a series of opaque indicia, a second transparent chart bearing a series of opaque indicia, mounted for movement relative to said first transparent chart, an indicator cooperating with both of said charts and actuated by said load counterbalancing mechanism, a screen, optical projecting means carried by said indicator, said transparent charts being annular and positioned concentrically one in back of the other, such series of opaque indicia on said transparent charts being concentrically spaced and said optical projecting means on said indicator being positioned to simultaneously project images of indicia of such series of indicia on both of said transparent charts on said screen.

10. In a device of the class described, in combination, weighing mechanism including load receiving means and load counterbalancing mechanism, load indicating means operatively connected to said load counterbalancing mechanism, said load indicating means including a fixedly positioned transparent chart bearing a series of opaque indicia, a second transparent chart bearing a series of opaque indicia, mounted for movement relative to said first transparent chart, an indicator cooperating with both of said charts and actuated by said load counterbalancing mechanism, a screen, means carried by said indicator for optically projecting images of indicia of such series of indicia on both of said transparent charts to said screen, said transparent charts being annular and positioned concentrically one in back of the other, and such series of opaque indicia on said transparent charts being concentrically spaced.

11. In a device of the class described, in combination, two parallel relatively movable charts bearing related indicia in ascending arithmetical series, a projector movable along both said charts and adapted to project juxtaposed images of indicia from both said charts upon a screen, index means for selecting certain of such juxtaposed images, means for positioning one of said charts to offset its series of indicia relative to the series of indicia borne by the other of said charts, and condition responsive means for positioning said projector and said index.

12. In a device of the class described, in combination, a fixed chart bearing indicia in ascending arithmetical series, a chart movable parallel to said fixed chart and bearing related indicia in ascending arithmetical series, a projector for simultaneously projecting images of the indicia borne by said charts, index means for simultaneously pointing out values from both said charts, means for causing movement of said movable chart and means for causing movement of said index, one of said movement causing means being responsive to changes in conditions to be measured, the other of said movement causing means being manually operable.

LAWRENCE S. WILLIAMS.